Figure 1:
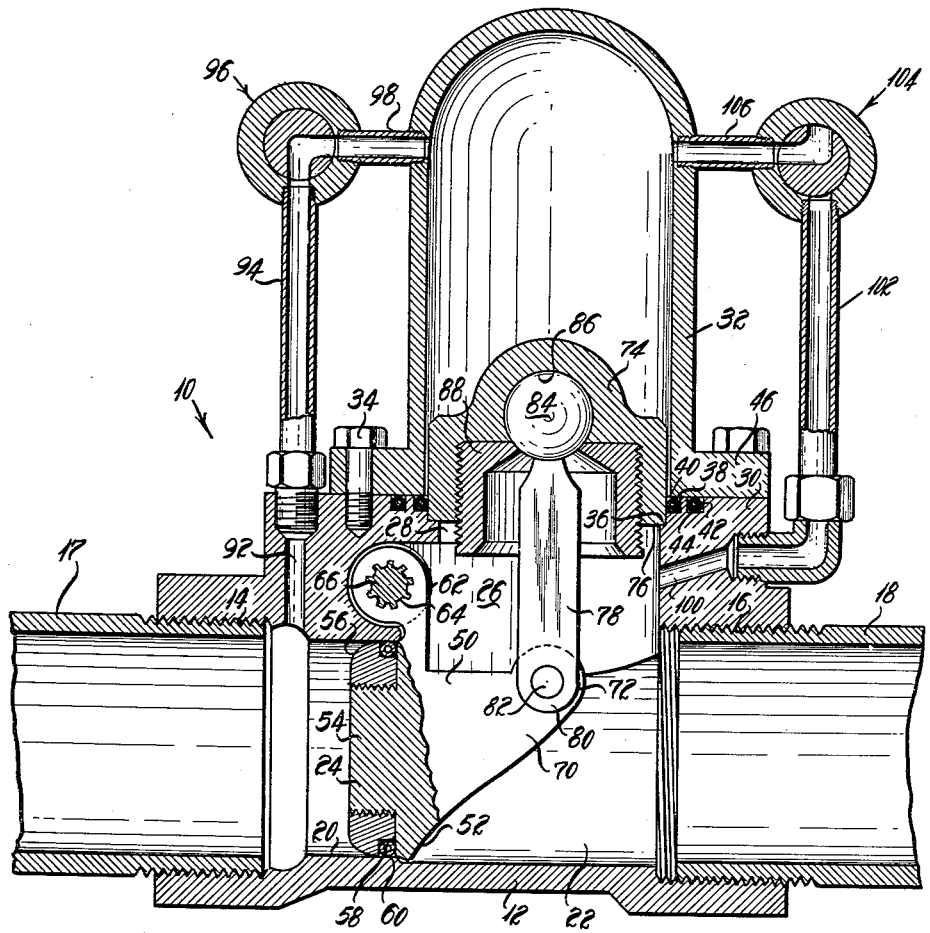

Nov. 6, 1962 J. B. McGAY 3,062,232
COMBINATION TWO DIRECTION CHECK AND GATE VALVE
Filed Dec. 29, 1958 2 Sheets-Sheet 1

INVENTOR
JOHN B. McGAY

BY
Strauch, Nolan & Neale
ATTORNEYS

United States Patent Office 3,062,232
Patented Nov. 6, 1962

3,062,232
COMBINATION TWO DIRECTION CHECK
AND GATE VALVE
John B. McGay, 1551 S. Yorktown Place, Tulsa, Okla.
Filed Dec. 29, 1958, Ser. No. 783,333
13 Claims. (Cl. 137—495)

This invention relates to new and useful improvements in fluid pressure operated swinging gate check and control valves and more particularly relates to a full opening swinging gate valve operable automatically and selectively for either direction of flow through the valve by utilizing line pressure of the fluid in the valve controlled line.

Valves somewhat similar to this general character, which have been previously proposed, consist essentially of a valve body with an aligned inlet and outlet, a swinging gate movable to an open position essentially out of the through flow path between inlet and outlet, and a gate operating fluid motor selectively subject to operating fluid pressures derived from locations upstream and downstream of the valve gate. These known proposals include special piston arrangements such as differential piston areas to provide different operating speeds in opening and closing directions and use clapper type valve gates requiring close cooperation between piston action and valve seat positions to maintain an effective seal at the valve closure over an extended period of operational life. These previously known valves are subject to leakage past the piston and past the valve closure when structural interrelationship between the motor piston and the valve clapper is changed due to any wear of parts, primarily any seating material. Furthermore, such valves are effective for only one direction of fluid flow.

Accordingly a primary object of this invention resides in providing a novel swinging gate valve operable as a check valve for either direction of fluid flow.

In conjunction with the foregoing object, a further object resides in providing such a two-direction flow, swinging gate check valve with control means enabling selective over-riding control of the flow checking function to enable controlled flow in either direction.

Another object resides in providing a novel swinging gate valve utilizing a circumferentially peripheral O-ring seal between a swinging gate and its seat with a fluid motor operator of the reciprocable piston type connected to and operable to control the gate position dependent upon desired type of control and direction of flow through the valve. In conjunction with this object a further object resides in providing a novel relationship between the fluid motor and swinging gate derived from a free fitting piston to cylinder relationship with a positive piston to cylinder seal near the end of the piston stroke, at which position the swinging gate is in a sealed, valve closed position.

A still further object resides in providing a two direction flow checking swinging gate valve in which a line pressure operated reciprocating piston type fluid motor is connected to the swinging gate, the effective piston area is greater than the valve closure port area, one face of the piston is open to one side of the valve gate, the other face of the piston can be selectively placed in fluid communication with either side of the valve gate, the piston has a free fit in its cylinder and a seal member provides a sealed piston to cylinder fit adjacent the end of the piston stroke, at which position the swinging gate is in a valve closed position.

Figure 2:
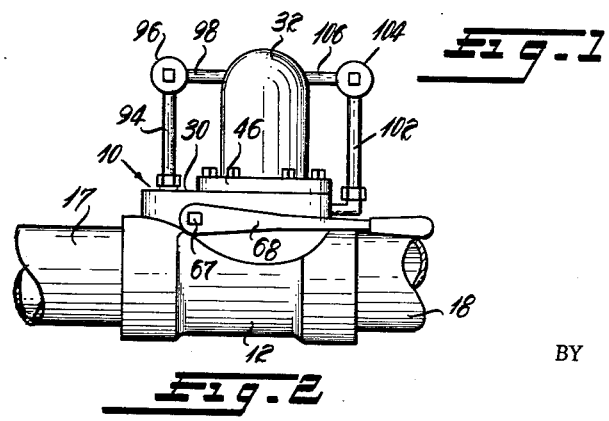
Figure 3:
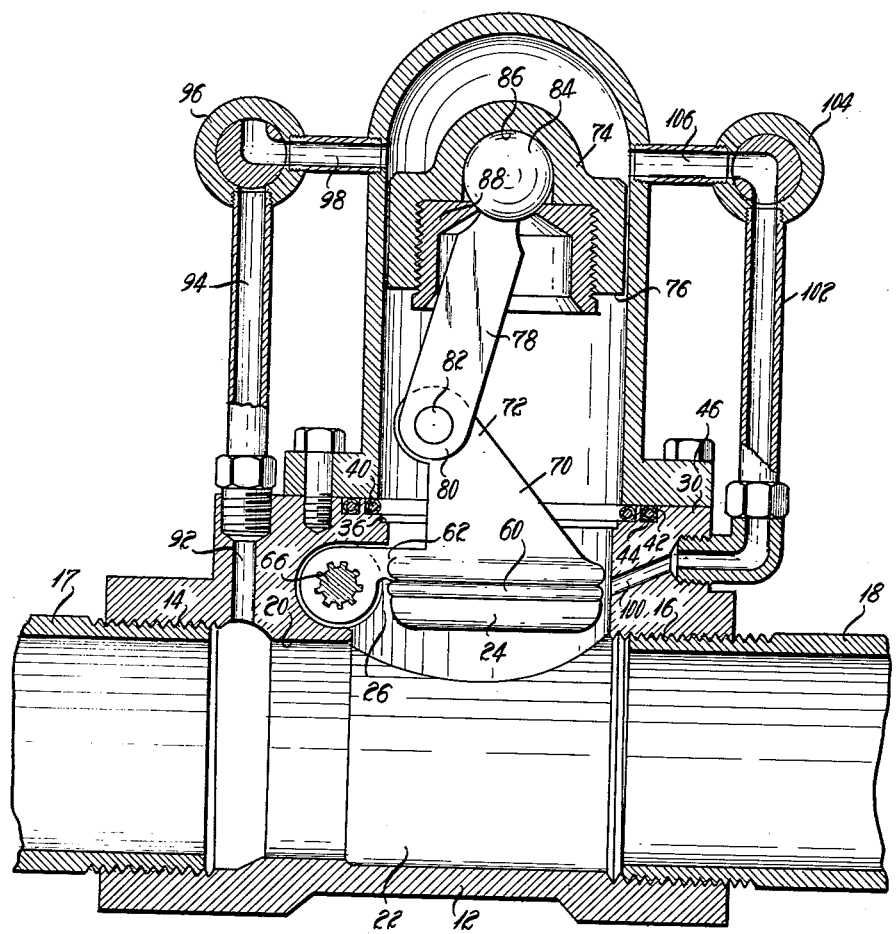

Further novel features and other objects of this invention will become apparent from the following detailed description, discussion and the appended claims taken in conjunction with the accompanying drawings showing a preferred structure and embodiment, in which:

FIGURE 1 is a longitudinal vertical section view of a valve constructed in accord with the concepts of this invention showing the gate in closed position and the control valving selected for positive closure against flow from left to right and enabling check valve action for use with desired flow from right to left;

FIGURE 2 is a reduced scale side elevation of the valve in FIGURE 1, showing a hand wrench positioned on the exterior end of the gate spindle; and FIGURE 3 is a vertical section of the valve shown in FIGURE 1 with the swinging gate in a valve open position and the control valving selected to enable check valve action for use with desired flow from left to right and for positive closure if flow is from right to left.

With reference to the drawings for a detailed description of the preferred illustrative embodiment, similar reference characters are used throughout to designate similar parts. In FIGURE 1, valve 10 consists of a body 12 with internally threaded opposed openings 14 and 16 enabling connection of the valve 10 to pipeline conduits 17 and 18. Flanged couplings can be used in lieu of the illustrated threaded coupling connections if desired. Inasmuch as valve 10 is intended to control flow in either direction, the installation will determine whether opening 14 is the inlet with opening 16 as the outlet or vice versa. In either event the fluid flow path is a straight through path between aligned openings 14 and 16.

Valve body 10 can be cast and desired portions machined. A cylindrical gate seat 20 is machined straight through between openings 14 and 16 and determines the classification size of the valve. The inside diameter of the gate chamber 22 is slightly greater than that of gate seat 20 enabling any requisite swing clearance for the gate 24.

Intermediate the two body openings 14 and 16, gate chamber 22 opens into a side wall cavity 26 from which a large opening 28 leads through the valve body side wall. Surrounding the opening 28 is a mounting pad construction 30 which mounts a motor cylinder bonnet 32 secured by screws 34. The external side of the mounting pad 30 is counterbored around the opening 28 to provide an annular shoulder 36 having an outer diameter approximately equal to the inside diameter of the cylinder bonnet. Shoulder 36 serves as a limit seat against which the motor piston (to be described) abuts at the lower extremity of its travel. A still larger counterbore 38 above the shoulder 36 provides a seat for a metal-cored O-ring 40 which serves as a piston seal in a manner to be described. Surrounding the counterbore 38 is an annular groove 42 which receives a sealing O-ring 44 (metal-cored if desired) which is slightly compressed into groove 42 by flange 46 of cylinder bonnet 32 being firmly clamped to mounting pad 30 by screws 34. O-ring 44 thus provides a fluid tight seal between the cylinder bonnet 32 and the valve body 10.

O-ring 40, being steel cored, maintains its shape and disposition within the annular seal seat recess 38. Its inner diameter is less than the inner diameter of the bonnet cylinder 32.

Gate 24 is made in two parts, the major part 50 including an annular portion 52 with a central threaded projection 54 upon which is threadedly secured a ring shaped, shouldered, O-ring retainer 56, which when assembled on the main part 50 provides an annular groove 58 within which is retained a metal-cored sealing O-ring 60. The annular portion 52, ring retainer 56 and O-ring 60 constitute a plug type swinging gate which can be swung to a seating position within the cylindrical seat 20. Retainer ring 56 and the annular portion 52 are of less diameter than the seat 20 and the outer diameter of the O-ring 60 is slightly greater than the seat 20, thus when the gate 24 is in closed position, O-ring 60 is under slight radial compression between the cylindrical surface of seat 20 and the base of the gate groove 58.

This provides a highly effective seal which is not dependent upon exact positioning of the gate as in a clapper type axial seal, and is effective as a seal for both directions of flow through the valve.

An upper arm 62 of main gate part 50 has a splined aperture 64 whereby it is non-rotatably secured on a splined portion of a gate spindle 66 which is journalled in the valve body 12. At least one end of the spindle 66 projects through a gland seal (not shown) to the exterior of body 12 and that exterior spindle end 67 (FIGURE 2) is squared to receive an external operator such as a wrench 68 or a motor, whereby positive external rotation of spindle 66 can be accomplished to position the swinging gate 24 when desired. When gate 24 is swung to a full open position, as in FIGURE 3, it is wholly positioned in the valve body cavity 26 away from interference with a through flow path between valve body openings 14 and 16.

Extended from the side of the gate portion 50, opposite the threaded projection 54, is an integral arm 70 with an apertured end 72. Above the arm end 72, a cylinder piston 74 is disposed with a free fit for reciprocation within the bonnet cylinder 32. The diameter of piston 74 is slightly greater than the inner diameter of piston sealing O-ring 40 and when piston 74 is at the lower end of its travel in cylinder 32 its external surface sealingly engages the O-ring 40 and its lower end 76 abuts the valve body piston seat shoulder 36 to positively determine the lower limit of piston travel. A ball headed connecting link 78 has a forked lower end 80 pivotally connected to the end 72 of gate arm 70 by pin 82. The ball end 84 of link 78 is retained in a centrally provided piston socket 86 by a retainer 88.

The effective piston head pressure area is approximately one and a half times the cross-sectional area of gate seat 20. Viewing FIGURE 1, it will be seen that a line from the center of spindle 66 to the center of the connecting link pivot pin 82 is approximately 30 degrees below a horizontal line through the spindle 66. Thus the leverage component between piston 74 and gate 24 is equal to the cosine of thirty degrees or about 0.866. Since line pressure is used to operate piston 74 and that same pressure acts against the face of gate 24 the piston area must be sufficiently larger than the effective area of gate 24, or the distance of the lever arm from the center of spindle 66 to the center of pivot pin 82 must be sufficiently greater than the distance of the lever arm from the center of spindle 66 to the center of gate seat 20, to provide an approximate ten percent superiority in piston thrust as opposed to the line pressure thrust against the gate 24 at the point of closing. The aforementioned ratio of effective piston area to gate seat cross-section area will provide such an advantage with the linkage arranged as illustrated.

Selective fluid communication from one side of the gate seat 20 to the upper end of the cylinder bonnet 32 is enabled through a valve body passage 92, conduit 94, control valve 96 and conduit 98. Selective fluid communication from the other side of gate seat 20 to the upper end of the cylinder bonnet 32 is enabled through a valve body passage 100, conduit 102, control valve 104 and conduit 106. Each of control valves 96 and 104 is schematically illustrated as plug type valve rotatable between open and closed positions. In partially opened positions, valves 96 and 104 will operate as throttling valves to control the speed of piston 74.

In operation, if gate valve 10 is installed in a fluid conduit with flow from the left, control valve 96 open and control valve 104 closed (as in FIGURE 1), gate 24 will remain in closed position because the superior force of the fluid under upstream pressure applied against the upper surface of piston 74 overrides the force of the fluid under upstream pressure applied against the gate 24. Under these control valve conditions when the gate 24 moves to a closed position from an open position, the differential of the fluid pressure against the left face of gate 24 over that against the right face of gate 24 increases as the downstream flow pressure is reduced by closing of the gate. However, this reduction in downstream pressure reduces the pressure on the lower side of piston 74 resulting in an increased differential between the upper and lower sides of piston 74. Thus the same conditions which increase the force tending to open gate 24 also increase the force on piston 74 tending to close the gate 24 and as the piston area and/or kinematic linkage between the piston and the gate are designed to provide a mechanical advantage for the piston forces, given the same fluid pressures against the piston and the gate, the piston force will prevail to move the gate to a closed position.

The use of the peripheral O-ring seal 60, on the swinging gate 24, seating within the ring seat 20 permits the power piston 74 to seek a seating and positive sealing disposition against its seal 40. As there is no positive block against the gate 24 at a particular sealed position within the ring seat 20, the piston 74 and gate 24 have seal positions independent of each other and will always positively seal in a valve closed position.

Turning now to FIGURE 3, if control valve 96 is closed and control valve 104 is opened, the space above piston 74 is placed in communication with the low pressure downstream side of valve 10, equalizing pressures on both sides of piston 74 and permitting the upstream pressure to swing the gate to an open position. The speed at which this opening movement of gate 24 occurs can be varied by the rate and amount of opening movement of control valve 104. Under these control valve conditions, valve 10 will function as a swing check valve. The gate 24 will not open completely to the position shown in FIGURE 3 but will swing free in the flow of the fluid from left to right and upon any reversal in such flow will swing closed at a rate controlled by the degree of opening of control valve 104. The gate will again open when flow again is from left to right and the rate of opening will be at the rate controlled by valve 104.

The free fit of piston 74 within the cylinder 32 is used because valve 10 is intended to serve as a check valve in combination with its function as a shut-off valve and when it functions as a check valve, the gate 24 and piston 74 must operate essentially free of excessive friction load. The piston is therefore fitted for a free sliding fit within its cylinder so its reciprocation does not constitute any appreciable load. This free fit requires a slight clearance between piston 74 and cylinder 32 (the clearance is greatly exaggerated in FIGURES 1 and 3) and of course means there will be leakage between the piston and cylinder walls except when the piston 74 seats against its detent shoulder 36 and seals against O-ring 40. In positions of piston 74, other than its sealed position (FIGURE 1) the pressure differentials between the two sides are small and resultant leakage is not important.

Prior art clapper type gates were effective primarily against flow in one direction, however, the peripheral O-ring gate seal 60 tends to become more effective as pressure increases regardless of direction of flow through the valve.

Returning to FIGURE 1, if flow were from right to left, control valve 96 were open and control valve 104 closed, gate 24 will move to an open position because of the fluid pressure force on the underside of piston 74 is superior to the fluid pressure force on the right side of gate 24. If flow reversed to be from left to right the gate will close, as has been previously described, and thus will act as a check valve against flow from left to right.

When flow in the conduit is from right to left and it is desired to close valve 10, control valve 96 is closed and control valve 104 is opened as in FIGURE 3. Pressures on opposite sides of piston 74 will then equalize and the swinging gate will swing into its seat 20, a closed valve position.

It is noted that when valve 10 is opened, for flow in either direction, by manipulation of valves 96 and 104, the gate 74 will not be drawn up to the full open position, but will function as a swinging gate. To prevent its function as a check valve and to place the gate in full open position it is necessary to turn the spindle by some external means (manual or motor power) and then lock the spindle by some simple locking means (not shown).

The foregoing description teaches the concept of a controllable swinging gate valve which will serve as a combination two-direction check valve and shut-off valve. The swinging gate peripheral seal enables an effective sealed shut-off against fluid flow in both directions. The free fitting power piston provides low friction loads during check valve action of the swinging gate, and the end limit sealing arrangement of the piston independent of a fixed seal position for the swinging gate enables positive sealing of piston and gate whenever a valve closed condition is dictated by the operator. This type of valve with two-directional flow control characteristics is very useful in manifold piping at pumping stations.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A fluid pressure operated swinging gate valve comprising: a ported valve body including a gate seat; an essentially cylindrical swingably mounted circular gate in said body adapted to fit substantially normal to and within said gate seat in a valve closed position; a piston and cylinder fluid motor on said body with said piston freely fitted in said cylinder for reciprocation and connected to operate said swinging gate; means to selectively place said cylinder under fluid pressure from fluid on either side of said gate seat; means providing a positive seal between said piston and said cylinder at a piston position where said gate is disposed within the gate seat; and means providing a seal between said gate and said gate seat independent of exact sealing disposition of said piston with its sealing means, sealing between the periphery of said gate and the substantially cylindrical seat surface throughout a short range of valve gate positions within said seat and providing an effective pressure seal for fluid flow direction either way through said valve.

2. A swinging gate valve as defined in claim 1 wherein said gate seal means is a metal cored O-ring disposed in a peripheral groove around said gate, adapted to be disposed in peripheral sealed engagement against said valve seat when siad gate is within said short range of valve gate positions.

3. A two-direction combination check and stop valve comprising: a valve body with two aligned flow ports and a substantially cylindrical valve seat therebetween; a swinging gate adapted to be positioned within and transverse of said valve seat with a peripheral O-ring sealing against said substantially cylindrical valve seat; a reciprocable fluid motor connected and operable to swing said gate between open and closed position; a limit stop determining one extremity of fluid motor position at which position said gate will be in a valve closed disposition; and means for selectively directing fluid from within the valve body at either side of said valve seat into said fluid motor to enable actuation of said motor and said gate.

4. A valve as defined in claim 3, wherein said fluid motor comprises a cylinder secured to said body and a piston reciprocable in the cylinder; one end of said cylinder is open and in fluid communication with the interior of said valve body at one side of said valve seat, the opposite end of said cylinder is closed and said selective means can direct fluid from upstream or downstream of said valve seat into the cylinder at said closed end; and said piston has a working face area sufficiently larger than the cross sectional area within said valve seat to provide a valve gate operating force sufficiently in excess of the force on said gate resulting from line fluid pressure to assure gate operation by said motor when required.

5. A valve as defined in claim 4, wherein a piston stop abutment is fixed adjacent the open end of said cylinder and an O-ring piston seal is disposed adjacent said open end of said cylinder to peripherally sealingly engage said piston when said piston abuts said stop abutment.

6. A valve as defined in claim 5, wherein said piston is reciprocable within said cylinder with a free fit excepting adjacent said one end limit of travel where said sealing O-ring engagement occurs.

7. A fluid pressure operated swinging gate valve comprising: a valve body having aligned inlet and outlet openings, a substantially cylindrical valve seat adjacent one of said openings, a gate chamber between said valve seat and the other of said openings, a recess leading from the side of said gate chamber, and a third opening from said recess through the body wall essentially transverse to said aligned openings; a gate with a peripheral O-ring seal swingably hung from said recess portion of said body, adapted to be moved from a sealed disposition within and transverse of said substantially cylindrical valve seat to a position within said recess out of a through flow path between said inlet and outlet openings; a fluid motor comprising a cylinder with a closed end and an open end and a piston reciprocable therein; means securing said open end of said cylinder on said body over said third opening; link means positively connecting said piston to said gate; means enabling a fluid tight seal between said piston and said cylinder when said piston is at the open end of said cylinder and said gate is in sealed position within said valve seat; fluid passage means, including a control valve, between the interior of the closed end of said cylinder and the interior of said body upstream of said valve seat; and a second fluid passage means, including a second control valve, between the interior of the closed end of said cylinder and the interior of said body downstream of said valve seat.

8. A valve as defined in claim 7, wherein a spindle is journalled in said valve body cavity with at least one end projecting to the exterior of said body; said gate is non-rotatably secured on said spindle and said exterior end of said spindle is provided with means enabling rotation of said spindle and gate by external means.

9. A valve as defined in claim 8, wherein said link means connecting said piston to said gate includes a rigid arm on said gate extending from one of its faces toward said cavity, a member pivotally connected at one end to the end of said arm, and a ball and socket connection between the other end of said member and said piston.

10. A fluid pressure operated swinging gate valve comprising: a body having two aligned flow openings with a substantially cylindrical valve seat therebetween; a gate with a peripheral O-ring seal, swung from said body and swingable into and away from sealed seating position within said substantially cylindrical valve seat; a fluid motor comprising a cylinder on said body and a piston reciprocable therein, one end of said cylinder being open to the interior of said body and the opposite end closed; link means between said piston and said gate; and means for selectively controlling fluid communication between said closed cylinder end and the interior of said body on each side of said valve seat; said piston and the kinematics of said link means providing a force advantage, when said piston is subjected to line pressure, over the force applied by the line pressure against said gate.

11. A valve comprising: a body having two openings substantially in alignment with each other, either opening serving as an inlet or outlet depending upon direction of fluid flow through said valve body, a substantially cylindrical valve seat between said openings; a gate including a peripheral seal means adapted to seat and seal within said substantially cylindrical valve seat; means swingably mounting said gate on an axis offset to one side of the flow path through the valve seat; a cylinder on said body having one closed end and the other end open to the interior of said valve body; a piston freely fitted for reciprocation in said cylinder; linkage positively connecting said piston and said gate for conjoint movement; means to limit piston travel and create a fluid seal between said piston and said cylinder adjacent the open end of said cylinder when said gate is seated within said valve seat; and control means for selectively placing the interior of the closed end of said cylinder in fluid communication with the interior of the valve body at either side of said valve seat.

12. A valve as defined in claim 11, wherein means are connected to said gate enabling swinging movement of said gate by external power apart from force from said piston and cylinder.

13. A fluid pressure operated swinging gate valve comprising: a valve body having aligned inlet and outlet openings, a substantially cylindrical valve seat adjacent one of said openings, a recess leading from the side of said gate chamber, and a third opening from said recess through the body wall essentially transverse to said aligned openings, said third opening being smaller than said piston and its edge on the exterior side of said valve body having a double counterbore to provide a piston limit shoulder and an O-ring seating recess; a gate with a peripheral O-ring seal swingably hung from said recess portion of said body, adapted to be moved from a sealed disposition transverse of said valve seat to a position within said recess out of a through flow path between said inlet and outlet openings; a fluid motor comprising a cylinder with a closed end and an open end and a piston reciprocable therein; means securing said open end of said cylinder on said body over said third opening; link means positively connecting said piston to said gate; means comprising a metal cored O-ring seal with an inner diameter slightly less than said piston disposed in said seating recess and maintained therein by the open end of said cylinder, enabling a fluid tight seal between said piston and said cylinder when said piston is at the open end of said cylinder and said gate is in sealed position within said valve seat; fluid passage means, including a control valve, between the interior of the closed end of said cylinder and the interior of said body upstream of said valve seat; and a second fluid passage means, including a second control valve, between the interior of the closed end of said cylinder and the interior of said body downstream of said valve seat.

References Cited in the file of this patent
UNITED STATES PATENTS

| | | |
|---|---|---|
| 428,671 | Ferrell | May 27, 1890 |
| 1,744,798 | Price | Jan. 28, 1930 |
| 2,251,414 | Neal | Aug. 5, 1941 |
| 2,445,163 | Williamson | July 13, 1948 |
| 2,704,648 | Cobb | Mar. 22, 1955 |
| 2,737,157 | Hefner et al. | Mar. 6, 1956 |
| 2,744,719 | McRae | May 8, 1956 |
| 2,886,062 | Wheatley | May 12, 1959 |

UNITED STATES PATENT OFFICE

CERTIFICATE OF CORRECTION

Patent No. 3,062,232 November 6, 1962

John B. McGay

It is hereby certified that error appears in the above numbered patent requiring correction and that the said Letters Patent should read as corrected below.

Column 5, line 34, for "a", second occurrence, read -- an essentially cylindrical --; lines 34 and 35, for "an essentially cylindrical" read -- a --; line 56, for "siad" read -- said --.

Signed and sealed this 4th day of June 1963.

(SEAL)
Attest:

ERNEST W. SWIDER
Attesting Officer

DAVID L. LADD
Commissioner of Patents